United States Patent
Wood et al.

(10) Patent No.: US 9,927,547 B2
(45) Date of Patent: Mar. 27, 2018

(54) POWER GENERATING COMMUNICATION DEVICE

(71) Applicants: Edward Wood, Kingwood, TX (US); Zhiyue Xu, Cypress, TX (US); Yang Xu, Houston, TX (US); David Gerrard, Magnolia, TX (US)

(72) Inventors: Edward Wood, Kingwood, TX (US); Zhiyue Xu, Cypress, TX (US); Yang Xu, Houston, TX (US); David Gerrard, Magnolia, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 869 days.

(21) Appl. No.: 13/773,024

(22) Filed: Feb. 21, 2013

(65) Prior Publication Data
US 2014/0002089 A1    Jan. 2, 2014

Related U.S. Application Data

(60) Provisional application No. 61/667,122, filed on Jul. 2, 2012.

(51) Int. Cl.
*G01V 3/20* (2006.01)
*E21B 47/12* (2012.01)
*G01V 11/00* (2006.01)

(52) U.S. Cl.
CPC ............... *G01V 3/20* (2013.01); *E21B 47/12* (2013.01); *E21B 47/121* (2013.01); *G01V 11/002* (2013.01)

(58) Field of Classification Search
CPC . E21B 43/00; E21B 33/12; G01V 3/00; C25F 7/00
USPC .......................... 324/324, 323, 347, 366, 438
See application file for complete search history.

(56) References Cited

U.S. PATENT DOCUMENTS

| | | | | |
|---|---|---|---|---|
| 2,364,957 | A * | 12/1944 | Douglas | E21B 17/003 324/356 |
| 4,495,990 | A | 1/1985 | Titus et al. | |
| 4,518,888 | A * | 5/1985 | Zabcik | 310/334 |
| 6,253,847 | B1 * | 7/2001 | Stephenson | C23F 13/16 166/248 |

(Continued)

OTHER PUBLICATIONS

Notification of Transmittal of the International Search Report and the Written Opinion of the International Searching Authority, or the Declaration; PCT/US2013/042861, dated Aug. 19, 2013.

(Continued)

*Primary Examiner* — Melissa Koval
*Assistant Examiner* — Rahul Maini
(74) *Attorney, Agent, or Firm* — Cantor Colburn LLP

(57) ABSTRACT

A self-powered borehole communication assembly including a first electrode member having a first electrode potential and a second electrode member having a second electrode potential different than the first electrode potential. The first and second electrodes form an electrochemical cell when disposed in a borehole fluid that is at least partially electrolytic. The electrochemical cell is operatively arranged for producing a current and a voltage with at least one of the current or the voltage configured to directly convey information related to at least one borehole condition, property, or parameter. A method of communicating is also included.

24 Claims, 2 Drawing Sheets

(56) References Cited

U.S. PATENT DOCUMENTS

| | | | | |
|---|---|---|---|---|
| 6,672,382 | B2* | 1/2004 | Schultz et al. | 166/65.1 |
| 6,818,596 | B1* | 11/2004 | Hayes | 507/120 |
| 7,096,955 | B2* | 8/2006 | Zhang | E21B 41/0085 |
| | | | | 166/302 |
| 7,277,026 | B2* | 10/2007 | Hall et al. | 340/854.8 |
| 8,061,444 | B2* | 11/2011 | Mullins et al. | 175/50 |
| 8,321,190 | B2* | 11/2012 | Hansen | E21B 43/00 |
| | | | | 166/305.1 |
| 8,564,315 | B2* | 10/2013 | Fisseler | G01N 17/02 |
| | | | | 166/250.01 |
| 8,754,651 | B2* | 6/2014 | Habashy et al. | 324/339 |
| 8,931,570 | B2* | 1/2015 | Casciaro | E21B 21/103 |
| | | | | 166/319 |
| 2005/0024231 | A1 | 2/2005 | Fincher et al. | |
| 2008/0135249 | A1 | 6/2008 | Fripp et al. | |
| 2012/0061095 | A1* | 3/2012 | Capderou | 166/373 |
| 2013/0008648 | A1* | 1/2013 | Lovorn et al. | 166/250.01 |

OTHER PUBLICATIONS

Stephanie V. Chasteen et al., "The Salty Science of the Aluminum-Air Battery," The Physics Teacher, vol. 46, Dec. 2008, pp. 544-547.

\* cited by examiner

POWER GENERATING COMMUNICATION DEVICE

CROSS REFERENCE TO RELATED APPLICATION

This application claims the benefit of an earlier filing date from U.S. Provisional Application Ser. No. 61/667,122 filed Jul. 2, 2012, the entire disclosure of which is incorporated herein by reference.

BACKGROUND

As systems become more advanced, communication to and from downhole components is increasingly important in the downhole drilling and completions industry. Particularly with respect to so-called extended reach wells, which can reach depths of forty thousand feet or more, it is difficult if not impossible to communicate via traditional methods, e.g., control line signal transmission. Other scenarios may also make it undesirable, inefficient, or impossible to use these traditional techniques. In addition to communication, many downhole components, such as sleeves, valves, and other actuatable members, as well as sensors, must be powered in order to operate. Supplying batteries or other power sources and achieving sufficient robustness downhole is another challenge faced by downhole operators. Accordingly, the industry would well receive advances and alternatives for both communicating and generating power downhole.

SUMMARY

A self-powered borehole communication assembly, including a first electrode member having a first electrode potential; and a second electrode member having a second electrode potential different than the first electrode potential, the first and second electrodes forming an electrochemical cell when disposed in a borehole fluid that is at least partially electrolytic, wherein the electrochemical cell is operatively arranged for producing a current and a voltage with at least one of the current or the voltage configured to directly convey information related to at least one borehole condition, property, or parameter.

A method of communicating, including disposing a first electrode, having a first electrode potential, and a second electrode, having a second electrode potential different than the first electrode potential, in a borehole fluid in order to form an electrochemical cell; generating a current or voltage between the first and second electrodes; and communicating information related to a borehole property, condition, or parameter directly with the current or voltage.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
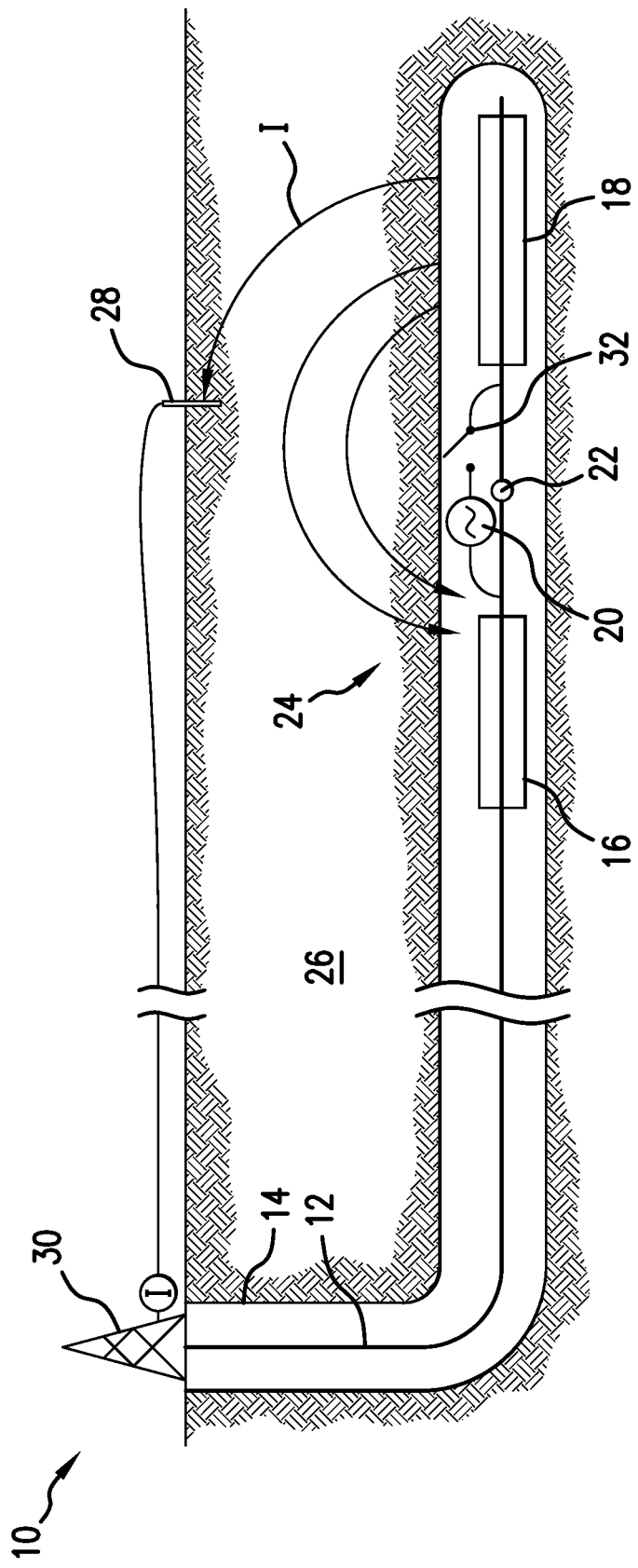
FIG. 1 schematically illustrates a downhole communication system according to one embodiment disclosed herein.

FIG. 1 schematically depicts a system 10 that is arranged to transmit data and signals to and from a downhole location. The system 10 includes a tubular string 12 located in a borehole 14. The string 12 includes a pair of electrode members, sleeves, or portions 16 and 18 having different standard electrode or chemical potentials, which enables the members 16 and 18 when disposed in an electrolytic fluid to form a system (e.g., referred to herein as an electrochemical or galvanic cell) that is capable of performing electrical work as a result of the occurrence of a chemical reaction or interaction. In the embodiment of FIG. 1, a power source 20 is coupled between the members 16 and 18, but a circuit is not formed due to an electrical isolation or gap sub 22 that creates an open circuit by electrically separating the members 16 and 18 (a switch may also be included for this purpose, and is discussed below). However, due to the differing electrode potentials of the members 16 and 18, when disposed in an electrolytic fluid, e.g., brine, an electrochemical or galvanic cell is formed for generating a current I.

The electrochemical cell effectively forms a self-powered downhole communication assembly 24 that can be used to transmit data or signals via the current I. For example, the data could be obtained from various downhole sensors (e.g., measuring temperature, pressure, pH, water cut, etc.) or equipment (e.g., valves, packers, sleeves, etc). For example, the current I can be sent, received, and analyzed according to known EM telemetry or other transmission techniques for transmitting information in the form of current from the device 24 through the earth, designated with numeral 26, to a communication device 28, which may measure the current or a voltage potential associated with the current I, e.g., with an electrode array or the like. The device 28 may be connected back to a wellhead 30 or other location (e.g., a computer terminal) where borehole operators can monitor and/or control downhole activity utilizing the information communicated thereto by the assembly 24. The power source 22 is included in this embodiment to provide any additional power necessary for sending signals according to EM telemetry techniques, as the current provided by the device 24 at any instantaneous moment may not be sufficient for communicating effectively with the device 28, depending on the distance through the earth 26 and/or its composition. Since the assembly 24 is continuously generating current (as long as it is submerged in a suitably electrolytic fluid), then even if the power supply 22 is to be included, the assembly 24 advantageously not only assists in generating current for communication purposes as noted above, but additionally acts to trickle charge the power source 22, i.e., when the power source 22 takes the form of a rechargeable battery or battery pack. For example, the power source 22 may be run-in uncharged and be charged solely from the assembly 24. The assembly 24 (and/or the power source 22) can also be used to provide power for activating sensors, actuating valves, or performing other downhole electrical tasks.

The member 16 in the illustrated embodiment could be formed by a sleeve, joint, plate, etc. made of carbon (e.g., incorporating graphene or carbon fibers, nanotubes, etc.), cobalt, nickel, titanium, copper, steel (i.e., a typical length of pipe), etc. or other materials having a relatively more positive electrode potential, or a combination including at least one of the foregoing, while the member 18 could be formed by a sleeve, joint, plate, etc., made of aluminum, magnesium, zinc, chromium, etc., or other materials being relatively more galvanically active or having a relatively more negative standard electrode potential, or a combination of the foregoing. Of course any other combination of materials differing in electrode potential could be used to produce an electrochemical cell.

A switch 32 can alternatively and/or additionally be included with the power source 22 coupled between the members 16 and 18. Opening the switch 32 will deactivate the electrochemical cell, such that the current I is not produced. Oppositely, closing the switch 32 will couple the members 16 and 18 together such that the electrochemical cell can operate as discussed above. In one embodiment, only the power source 22 is included and the system 10 operates as discussed above. In another embodiment, only the switch 32 is included and the relatively constant current I provided between the members 16 and 18 is controlled by alternatingly opening and closing the switch 32. The device 28 would then detect either some current or no current, depending on the open/closed status of the switch 32. By associating the detection of current/voltage as a '1' and the lack of detection as a '0', information can be communicated in binary form from the assembly 24 to the device 28. The power from the assembly 24 can be used to control the operation of the switch 32 (e.g., by charging capacitors, similar to an automobile's windshield wiper assembly).

In one embodiment, the known or estimated salt or electrolyte concentration in the downhole brine (e.g., 3% NaCl) and the varying current generated by the electrochemical cell formed by the members 16 and 18 can be used to calculate the percent or ratio of water flowing near the communication assembly 24. That is, the generation of current/voltage will be increased when greater concentrations of brine, as opposed to oil, are used in the electrochemical cell. Advantageously in this embodiment, in addition to generating power and enabling communication as discussed above, the assembly 24 is additionally sensing a downhole condition.

Figure 2:
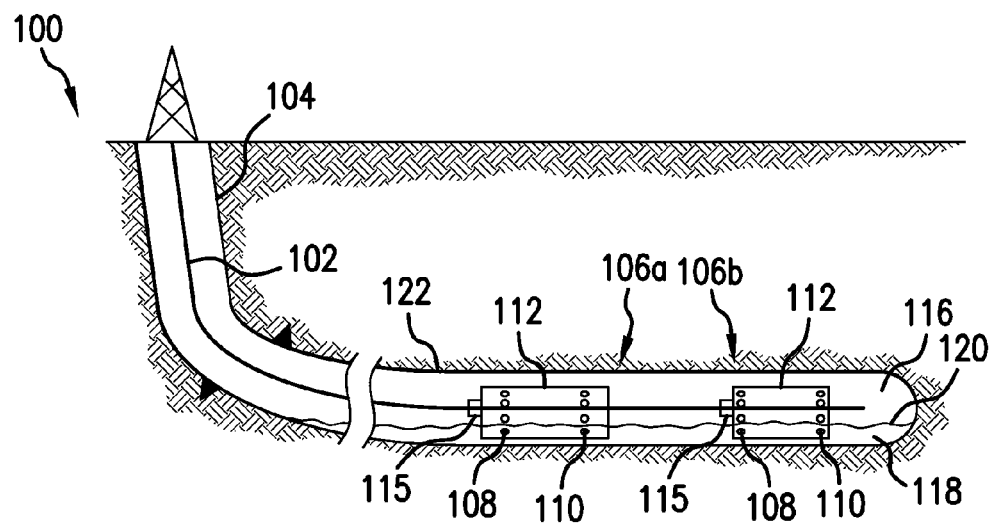
FIG. 2 schematically illustrates a downhole communication system according to another embodiment disclosed herein.
Figure 3:
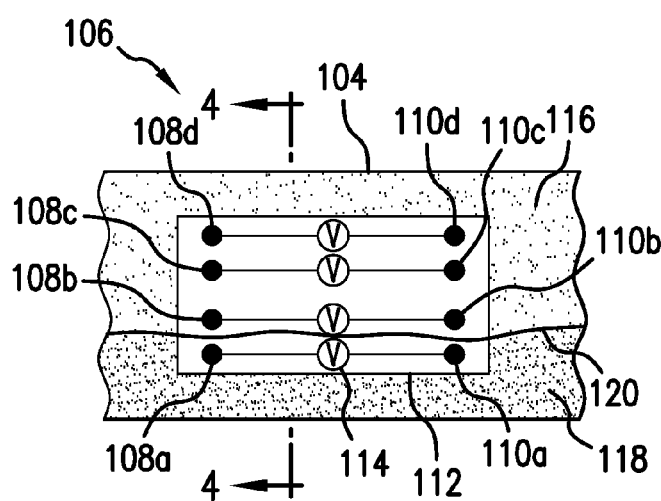
FIG. 3 is an enlarged view of a self-powered communication and/or sensor device from FIG. 2 (the string of which it is a part not illustrated)
Figure 4:
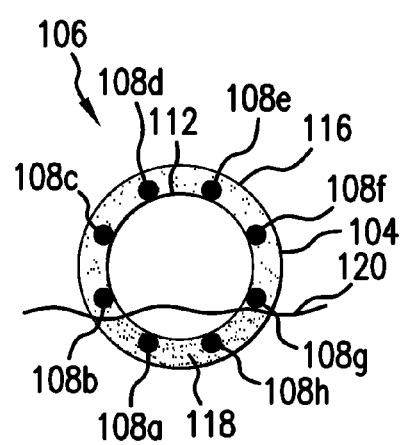
FIG. 4 is a cross-section of the device taken generally along line 4-4 in FIG. 3.

A system 100, illustrated in FIGS. 2-4, is arranged to perform the above-mentioned three tasks, namely, to generate a current/voltage, sense a downhole condition, and use the current/voltage to communicate information (specifically, where the information corresponds to the sensed condition). The system 100 includes a tubular string 102 run-in a borehole 104. The string 102 includes one or more self-powered communication and/or sensing devices 106 for monitoring and/or communicating information related to the borehole 104. Two such devices are shown and designated 106a and 106b, although these are collectively referred to collectively as the device(s) 106. In one embodiment discussed in more detail below, the device 106 senses a property, condition, or parameter in the borehole 104 and, via the same means used to sense, generates power for communicating information corresponding thereto. In one embodiment, also discussed in more detail below, the property sensed relates to a composition of a fluid in the borehole 104.

Detailed Description

The device 106 includes a first plurality of electrodes 108 and a second plurality of electrodes 110 mounted in a body 112. The electrodes 108 and 110 are conductively coupled, either through the body 112 itself or via conductors in the body 112. By selecting the electrodes 108 and 110 from materials having different electrode potentials and submerging the electrodes 108 and 110 in a fluid present in the borehole 104, an electrochemical cell can be formed. That is, in the presence of an electrolytic fluid, the electrodes having the more negative potential or being in a more electrolytic fluid (i.e., the anodes) will transfer electrons to the electrodes having a more positive potential or being in a less electrolytic fluid (i.e., the cathodes). It is to be understood that any materials having suitably different electrode potentials could be used, such as aluminum, zinc, magnesium, etc. for the anodes and carbon (e.g., including composites having graphite, graphene, or carbon fibers, nanotubes, etc.), cobalt, nickel, titanium, copper, steel, etc. for the cathodes. Alternatively, it is noted that the electrodes 108 and 110 could be formed from the same material and the electrolytic properties of the fluids in which they are submerged could be different. The batteries or electrochemical cells can operate via hydrogen evolution, oxygen reduction, or other chemical processes, and examples of batteries or electrochemical cells that can be formed according to the above include, but are not limited to, the following: Air batteries such as Al-Air, Al-Carbon (graphite, metalized or metal coated graphite, composites with carbon micro- or nanostructures, etc.), Mg-Air, Mg-Carbon (graphite, metalized or metal coated graphite, composites with carbon micro- or nanostructures, etc.), Zn-Air, Zn-Carbon (graphite, metalized or metal coated graphite, composites with carbon micro- or nanostructures, etc.), Fe-Air, Fe-Carbon (graphite, metalized or metal coated graphite, composites with carbon micro- or nanostructures, etc.; Li-Air; Metal-Metal batteries such as Al—Fe, Al—Ni, Al alloy (e.g., 6000)-Al alloy (e.g., 2000, 7000), Al—Zn, Li-Metal; concentration batteries such as Al—Al (in different electrolyte), Cu—Cu (in different electrolyte), Zn—Zn (in different electrolyte); or hybrids or combinations thereof such as different types of the above or others coupled together in series or parallel, one type of battery being used to generate power to charge another type of battery to store and/or distribute the power, microgalvanic cells arranged in series or parallel, etc. Since oxygen is not readily available downhole, batteries relying on oxygen reduction could have cathodes disposed in an oxygen or air filled chamber, or some other source of oxygen could be supplied, such as the decomposition of potassium chlorate when mixed with manganese dioxide.

Using measurements of the current produced between the electrodes and/or the voltage associated therewith, properties of the fluid, namely electrolytic properties, can be detected by the device 106. That is, the creation of a greater voltage indicates that the fluid or fluid component in which the electrodes 108 and 110 are disposed is better able to transfer electrons. For example, electrodes submerged in a heavily hydrocarbon-based fluid component will correspond to a very low voltage or no voltage at all, while a pair submerged in brine-heavy fluid component will have a measurably significant voltage. As another example, the voltage is also a function of pH, particularly if the fluid component is either very basic (e.g., a pH above 10) or very acidic (e.g., a pH below 4). In this way, a cementing operation can be monitored as cement is significantly more basic (e.g., having a pH of about 13) than the downhole mud and other fluids present in a borehole (referred to as "mud" for convenience in explanation, although it should be appreciated that it could contain any combination of brine, oil, etc.). Similarly, an acidizing operation can be monitored as acids used in downhole treatments have a pH significantly less than that of the surrounding mud. For example, the progress of acid or cement along the length of the borehole 104 can be monitored, e.g., by first detecting the presence of the cement/acid at a first device 106, e.g., the device 106a, then at a subsequent device 106, e.g., the device 106b, and so on.

Advantageously, it is the very process of generating power that enables the device 106 to sense the downhole property, condition, or parameter. Thus, the current and/or voltage generated relates to the downhole property, condition, or property and can be used directly to convey information related thereto. For example, as shown in FIG. 3, a voltmeter or other sensor 114 capable of sensing voltage can coupled across at least one pair of electrodes 108 and 110. As described above, the varying level of voltage communicated to the sensors 114 is able to convey information related to some sensed property in the borehole 104 or the fluid therein.

Furthermore, the same current/voltage that is already sensing and conveying information related to the downhole property, condition, or parameter can additionally be used to power, trigger, or communicate with at least one other mechanism 115. For example, the mechanism 115 could be another communication device, e.g., a transmitter, repeater, antenna, EM telemetry component, etc., e.g., for relaying the information regarding the downhole property, condition, or parameter to borehole operators at surface. In one embodiment, the mechanism 115 is specifically a sonic or ultrasonic transmitter, repeater, antenna or other component for enabling the transfer of a signal sonically or ultrasonically. For example, in one embodiment the mechanisms 115, two of which are shown in FIG. 2, are each signal repeaters for receiving a signal and repeating the received signal, e.g., wirelessly, sonically, ultrasonically, etc. By including a plurality of the mechanisms 115 in the form of signal repeaters along the borehole 104, a signal, e.g., from the device 106, can be relayed to any desired location, e.g., the wellhead or some other borehole operator location (e.g., a computer terminal).

The mechanism 115 could also be a sensor, e.g., to verify the information sensed by the device 106. For example, since a voltage increase or decrease in a downhole fluid could potentially correspond to more than one event, a pH sensor could be included to verify the pH and thus confirm the likelihood that cement is at the device 106, a resistivity sensor could be included to help confirm oil/water concentration at the device 106, etc. As another example, sensors unrelated to the information being sensed, but otherwise important to completion, production, or other downhole operations could be included. For example, the mechanism 115 could be a geophone for sensing geological or seismic data, e.g., during fracturing operations. It may be important to either separate the device 106 from the string 102 or otherwise isolate the device 106 from vibrations in the string 102 if a geophone is used. Sleeves, valves, and other actuatable devices could also be operated via the power generated by the device 106, and could be automatically triggered upon certain events, e.g., an inflow control valve closing off production from a zone proximate to the device 106 if a water concentration is detected to be too high. As noted above, the device 106 provides a means to communication with, to, or from downhole components such as the mechanism 115 and surface, particularly when other means, such as control line data transmission, is not feasible or cost effective, e.g., in extended reach wells.

In an environment where there is laminar or slug flow in a highly deviated or horizontal section of a borehole, different densities of components of the downhole fluid will naturally separate the fluid components. For example, FIGS. 2-4 depict a first (relatively less dense) fluid component 116 vertically separated from a second (relatively more dense) fluid component 118 at a fluid boundary 120 in a deviated portion 122 of the borehole 104. For example, since water (brine) is denser than oil, the oil will float atop the water, thus resembling the fluid component 116 atop the component 118. Properties of the fluid components 116 and 118 will alter the voltage potential between the electrodes submerged in each fluid component measured by the device 106 (or sensors disposed therewith).

In one embodiment, the electrodes 108 and 110 are arranged in electrically coupled pairs (e.g., a wire connects between each pair 108a/110a, 108b/110b, 108c/110c, 108d/110d, etc. with one of the sensors 114 measuring voltage across each pair as shown in FIG. 3), with the electrodes of each pair located at approximately the same rotational position about the device 106. Effectively, each pair forms its own electrochemical cell, such that the device 106 can include an array of electrochemical or galvanic cells. The pairs are designated with the same alphabetic identifiers (e.g., a, b, c, d, etc.) following the base numerals 108 and 110. By measuring the voltage between each pair and evaluating the percentage of the pairs that report voltages in different ranges, properties of the fluid components 116 and 118 can be gleaned. For example, an electrode pair submerged in a heavily hydrocarbon-based fluid component will correspond to a very low voltage or no voltage at all, while a pair submerged in brine-heavy fluid component will have a measurably significant voltage. In this configuration, the percentage of pairs that have a relatively high voltage will correspond to the ratio of the fluid that is aqueous, i.e., the water cut or ratio of water to oil. For example, in the embodiment of FIGS. 2 and 3, the fluid boundary 120 is located such that two of the eight illustrated pairs of the electrodes (those identified with 'a' and 'h') are located in the fluid component 118 below the boundary 120, while the remaining pairs are located in the fluid component 116 above the boundary 120. Thus, in this example, it would be determined that the fluid component 118 comprises a relatively small portion of the total composition of the fluid in the borehole 104 proximate to the device 106. Of course, any number of electrodes or pairs thereof could be included, e.g., providing variable degrees of accuracy for the ratio of the fluid components 116 and 118. Additionally, multiple ones of the device 106 could be included along the length of the string 102 for determining water cut or other properties of the borehole fluid and/or its fluid components at various locations in the borehole 104. It is noted that only one of the electrodes 108 and/or 110 need to be included in a plurality. For example, in another embodiment, the electrodes 108 are replaced by a common cathode (e.g., a full or partial ring, or some other shape), with ones of the sensors 114 coupled across the common cathode and each of the electrodes 110 (as anodes). This configuration would result in essentially the same operation as described above (e.g., ones of the electrodes 110 disposed in the fluid component 116 generating different voltages than ones of the electrodes 110 disposed in the fluid component 118 even when all paired to a common electrode).

As another example, the voltage is also a function of pH, particularly if the fluid component is either very basic (e.g., a pH above 10) or very acidic (e.g., a pH below 4). In this way, a cementing operation can be monitored as cement is significantly more basic (e.g., having a pH of about 13) than the downhole mud and other fluids present in a borehole.

Similarly, an acidizing operation can be monitored as acids used in downhole treatments have a pH significantly less than that of the surrounding mud and fluids. In these embodiments, the percentage of electrode pairs that result in a relatively higher voltage corresponds to the percentage and/or locations of the device 106 that has been cemented or acidized, respectively. It is to be appreciated that the electrodes 108 and 110 could be positioned in other arrangements or locations, e.g., inside a tubular string, vertically instead of horizontally aligned for identifying different components in a fluid column, etc.

Of course, any combination of the above-described embodiments could be utilized according to the current invention. In one embodiment, the bodies 112 of the devices 106a and 106b are made from materials having different electrode potentials, and are, e.g., arranged generally as described with respect to the electrode members 16 and 18 discussed with respect to FIG. 1. Alternatively stated, each electrode members 16 and 18 in the electrochemical cell of FIG. 1 could be arranged as one of the devices 106. That is, essentially this would provide a larger electrochemical cell or battery having smaller electrochemical cells at each of the larger electrochemical cell's electrodes. In this way, the configuration of FIG. 1 could be used not only to communicate to surface, e.g., using current through the earth 26 according to EM telemetry techniques, but would also sense particular information regarding downhole properties proximate to each electrode of the thereof (which information can of course be communicated to surface). As discussed at length, this would advantageously provide a system that generated its own power, sensed relevant downhole properties, conditions, or parameters, and also communicated information related to these properties conditions, or parameters.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A self-powered borehole communication assembly, comprising:
    a first electrode member having a first electrode potential; and
    a second electrode member having a second electrode potential different than the first electrode potential, the first and second electrodes forming an electrochemical cell when disposed in a borehole fluid that is at least partially electrolytic;
    wherein the electrochemical cell is operatively arranged for producing a current and a voltage with at least one of the current or the voltage configured to directly convey through the earth information related to at least one sensed borehole condition, property, or parameter proximate to one of the first and second electrodes.

2. The assembly of claim 1, wherein the borehole condition, property, or parameter is sensed by the self-powered communication assembly and reflected by the current or the voltage varying in response to different values or qualities of the borehole condition, property, or parameter.

3. The assembly of claim 2, wherein the borehole condition, property, or parameter relates to a composition of the borehole fluid.

4. The assembly of claim 3, wherein the composition of the fluid is defined by at least a first fluid component and a second fluid component and the composition is sensed by the system by a comparison of the voltage actually measured to a first value representing the electrochemical cell being used in the first fluid component only and to a second value representing the electrochemical cell being used in the second fluid component only.

5. The assembly of claim 4, wherein the fluid includes brine and oil, and the voltage is comparatively less as the fluid comprises higher concentrations of oil than water.

6. The assembly of claim 3, wherein the composition includes mud and either cement or acid and the voltage is comparatively higher in the presence of the cement or the acid than the mud.

7. A system including a plurality of assemblies according to claim 1 disposed at different locations in a borehole.

8. The system of claim 7, wherein the assemblies are disposed at different axial locations in the borehole.

9. The system of claim 7, wherein the assemblies are disposed at different rotational locations in the borehole.

10. The system of claim 9, comprising a device including the plurality of the assemblies, wherein the first and second electrodes of each of the assemblies are arranged in a pair in order to sense the borehole property, condition, or parameter at the different rotational locations.

11. The assembly of claim 1, wherein at least one of the first or second electrodes forms a body of an electrochemical device that includes at least a third electrode member and a fourth electrode member for forming a secondary electrochemical cell.

12. The assembly of claim 11, wherein the secondary electrochemical cell is operatively arranged for creating a secondary voltage or current that changes in value in response to changes in the borehole property, condition, or parameter.

13. The assembly of claim 1, wherein the current and the voltage also powers at least one other mechanism coupled therewith.

14. The assembly of claim 13, wherein the at least one other mechanism is a sensor operatively arranged to verify or confirm the information regarding the borehole property, condition, or parameter.

15. The assembly of claim 13, wherein the at least one other mechanism is a sensor operatively arranged to sense at least one other borehole property, condition, or parameter.

16. The assembly of claim 15, wherein the sensor is a geophone for sensing seismic or geologic data.

17. The assembly of claim 13, wherein the at least one other mechanism is a valve, sleeve, or other actuatable member.

18. The assembly of claim 17, wherein the valve, sleeve, or other actuatable member is triggered by the assembly automatically in response to the borehole condition, property, or parameter meeting a predetermined status.

19. The assembly of claim 13, wherein the at least one other mechanism is a communication device, a transmitter, a repeater, an antenna, or a combination including at least one of the foregoing.

20. The assembly of claim 19, comprising a plurality of the mechanisms along the borehole, together operatively arranged to relay the information from a downhole location to a wellhead or an operator location.

21. The assembly of claim 19, wherein the at least one other mechanism is part of a sonic or ultrasonic signal transmission system.

22. A method of communicating, comprising:
disposing a first electrode, having a first electrode potential, and a second electrode, having a second electrode potential different than the first electrode potential, in a borehole fluid in order to form an electrochemical cell;
generating a current or voltage between the first and second electrodes; and
communicating through the earth information related to a sensed borehole property, condition, or parameter proximate to one of the first and second electrodes directly with the current or voltage.

23. The method of claim 22, further comprising powering at least one other mechanism with the current or voltage.

24. The method of claim 22, wherein the borehole property, condition, or parameter relates to a composition of the borehole fluid and the electrochemical cell is operatively arranged to alter a value of the current or voltage in response to changes in the borehole fluid, the method further comprising sensing the at least one borehole property, condition, or parameter based on the value of the current or voltage.

* * * * *